G. A. ROSSITER & J. E. BEATTIE.
ATTACHMENT FOR GYROSCOPIC COMPASSES.
APPLICATION FILED MAR. 9, 1916.
1,221,477.
Patented Apr. 3, 1917.
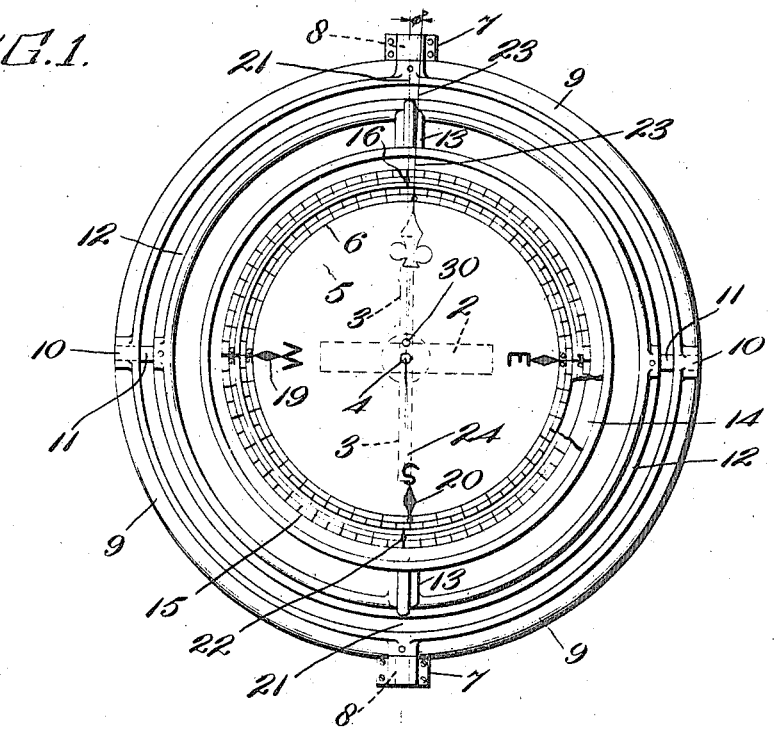
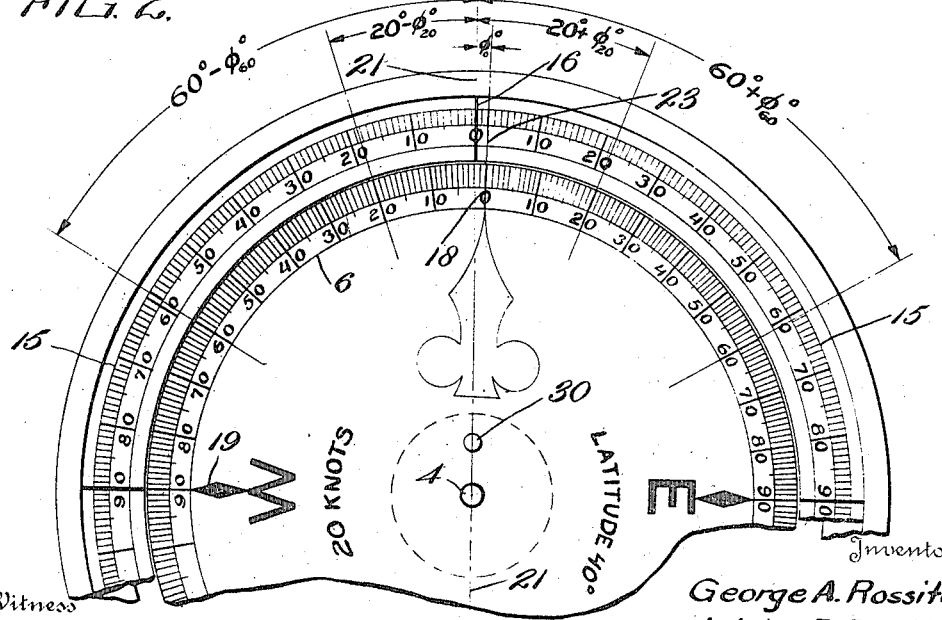
Witness
A. M. Trogner.
Inventors
George A. Rossiter
and John E. Beattie
By T. M. Witherspoon
Attorney

UNITED STATES PATENT OFFICE.

GEORGE A. ROSSITER, OF BROOKLYN, AND JOHN E. BEATTIE, OF NEW YORK, N. Y., ASSIGNORS TO FRANKLIN G. CARRIE, OF NEW YORK, N. Y., EXECUTOR OF THE ESTATE OF MERVYN E. CARRIE.

ATTACHMENT FOR GYROSCOPIC COMPASSES.

1,221,477.  Specification of Letters Patent.  Patented Apr. 3, 1917.

Application filed March 9, 1916. Serial No. 83,085.

*To all whom it may concern:*

Be it known that we, GEORGE A. ROSSITER and JOHN E. BEATTIE, citizens of the United States, residing, respectively, at Brooklyn, county of Kings, and at New York city, in the county of New York and State of New York, have invented certain new and useful Improvements in Attachments for Gyroscopic Compasses; and we do hereby declare the following to be a full, clear, and exact description of the invention, such as will enable others skilled in the art to which it appertains to make and use the same.

This invention relates to attachments for gyroscopic compasses and especially to those attachments involving the use of a graduated circle turning with the ship and a specially graduated circle remaining substantially stationary with the gyroscopic element, and adapted to correct certain errors of the compass due to changes in latitude.

The object of the invention is to provide a gyroscopic compass with means by which errors due to changes of latitude may be readily ascertained and the true course of the vessel readily read off without having to consult tables or other data.

With these and other objects in view the invention consists in the novel details of construction and combinations of parts, more fully hereinafter disclosed and particularly pointed out in the claims.

Referring to the accompanying drawings forming a part of this specification in which like numerals designate like parts in all the views—

Figure 1 is a diagrammatic plan view of a gyroscopic compass supported on gimbals and provided with this invention; and Fig. 2 is an enlarged detail view partially broken away of a portion of the parts shown in Fig. 1.

It is well known, to those skilled in the art, that the directive force of a gyroscopic compass depends upon the earth's rotation and that any movement of the instrument over the earth's surface can be resolved into a component about the north and south axis and into another component about the east and west axis. It is further well known, that a movement over the earth's surface in an east and west direction of the compass merely adds to or subtracts from the angular velocity of the earth and does not effect the indications of the instrument.

On the other hand, it is recognized by those skilled in the art that a movement of the compass over the earth's surface in a north and south direction, corresponds to a rotation of the earth about an east and west axis, and that such a movement must therefore be added vectorially to the angular speed of the earth. In other words, those skilled in the art recognize that if we assume that a gyroscopic compass is mounted on board a ship sailing due north at the equator and at a speed of say 20 knots an hour, or say about 23 miles an hour, at the end of an hour the instrument will be situated say 23 miles north of the starting point and will have been carried through space on an arc struck from a radius equal to that of the earth's radius or at a speed of say 1000 miles an hour. In other words the effect of the motion on the compass will be similar to that of the rotation of the earth around a north and south axis at say a speed of 1000 miles per hour combined with a rotation around an east and west axis at a speed of 23 miles an hour.

Therefore the direction which the compass travels through space under the conditions just stated will not have been at an angle perpendicular to the polar axis of the earth, but such direction will be deflected to the north of the starting point at an angle φ depending on the speed and on the latitude.

Stated in other words, the natural tangent of the angle φ will be equal to the speed divided by the velocity of rotation, or to say 23 divided by 1000, or approximately .023. This particular natural tangent corresponds to say an angle 1° 20′.

Therefore in the case supposed it is well recognized by those skilled in the art that the north pointing axis of the gyroscope wheel will be directed toward a point in space of say 1° 20′ west of the true meridian, and will therefore show an error of this character.

The angle φ may be called the angle of deflection due to the speed of the ship and may be determined as follows:

Let
$\varphi$ = angle of deflection due to speed of ship.
B = angle of sailing course.
X = angle of latitude.

$$\text{Tangent of } \varphi = \frac{S \cos B}{V \cos X} = \text{tang. } \varphi = \frac{S \cos B}{V \cos X} = \frac{23 \times .93969}{1037.4 \times .76604}$$
$$= .02720 = 1° 33' \text{ westerly}$$

S = speed of ship in miles per hour.
V = velocity of earth in miles per hr. at equator = 1037.4.
W = angular velocity of earth.
E = radius of earth in miles.

Then

Example:
X = 40° N or S.
B = N—20° E.
S = 23 miles.

An analysis of the foregoing example shows, that the sailing speed of a ship in a northerly direction will produce a deflection $\varphi$ in a westerly direction, and a southerly sailing course a deflection $\varphi$ in an easterly direction.

Therefore it is possible to so construct a particular azimuth circle as to indicate correctly for any particular sailing course and predetermined speed and latitude.

The accompanying drawing shows an azimuth circle 6 constructed in this manner, suitable for a speed of 20 knots and for latitude 40° north or south.

It will appear below that the western half of the azimuth circle is gradually expanded on both sides of the west point, and that the eastern half is gradually contracted on both sides of the east point, giving at the north and south points the greatest amount of deflection corresponding to angle $\varphi$; and that as the value of $\varphi$ must decrease from the north and south points and become zero at the east and west points that the said circle 6 is correct for any sailing course provided the latitude and speed do not change too much.

Referring to the accompanying drawings:
2 represents the gyroscopic rotating element which remains fixed in its original plane of rotation, 3 the north and south pointing axis of the element 2, while 4 represents the end of an axis arranged at right angles to the axis 3, and adapted to receive a card 5, having the graduated circle 6.

As will be clear to those skilled in this art the gyroscopic element or disk 2, may be variously mounted or supported so that it may have three degrees of freedom, or turn freely about three axes located at right angles to each other. In the drawings in which a portion only of one form of such mounting is illustrated, 7 represents the base of any suitable standards which may be secured to the deck of a ship, 8 represents pivotal supports in said standards for the outer ring 9, provided with the bearings 10, located at 90° from the pivots 8; and 11 represents pivots carried by the inner ring 12 resting in the bearings 10.

The inner ring is provided with a frame 13, to which is attached the card or circle, support 14, carrying the outer graduated circle 15, all as will be clear from the drawings. The weight of the gyroscopic element 2 is or may be supported through the frame 13, the rings 12 and 9 and the standards 7, in any suitable manner, not illustrated, so that while the inner circle 6 remains substantially stationary when the ship is turning in azimuth, the outer circle 15 turns with the ship.

The said outer circle 15 may be provided with the usual lubbers point 16 to indicate the head of the ship, and is preferably graduated in degrees of equal lengths of arc throughout, as shown.

The inner circle 6, on the other hand, while containing the same number of subdivisions or degrees as the outer circle, does not have its degrees all of the same length of arc as will be clear from the drawings. In other words the length of each division of the inner circle 6, is determined by the formula above given, with the result that the divisions of the western half extending from the north point 18 to the south point 20 are gradually expanded on each side of the west point 19 as above stated; so that the said north and south points are displaced by an angle 5 to the east of the positions they would ordinarily occupy.

In other words, if we consider a line 21, passing through the pivots 8, the lubbers point 16 and the point 22 on the outer circle 15 which is truly 180° from the point 16, and if we compare said line with the line 23 which extends radially from the center 4 to and through the north point 18 on the inner circle 6, we will see at once that the line 23 makes an angle $\varphi$ with the line 21. The line 24 which extends radially from the center 4 and passes through the south point 20 on the circle 6, likewise makes an angle $\varphi$ with the line 21.

It therefore follows that the western half of the circle 6 exceeds 180° in true arc measure by twice the value of the angle $\varphi$, and that the eastern half of said circle 6 is less than 180° in true arc measure by an amount equal to twice the value of the angle $\varphi$.

Since the graduations of the inner circle 6 are expanded and contracted in the manner indicated, it follows that the north point 18 of the said circle will indicate a direction to the east of the true north which is in error an amount exactly equal to the westerly error of the compass due to the movement of the ship over the earth's surface; and that therefore, if we radially prolong the lubbers point 16, it will cross the circle 6, at graduations which will indicate the true directions for all courses for the particular speed and the particular latitude for which the circle 6 is graduated.

In practice it is found that the compass error is so small for ordinary speeds of vessels that a card 5 that is correct for a given speed and latitude, will also be sufficiently accurate for speeds greater or less than the designed speeds, that it may be still used although the speed is considerably varied. The same principle applies to changes in latitude, so that a comparatively small set of cards such as 5, may be employed to navigate a ship over the world. The limits of speed and latitude are conveniently marked on each card 5, and when these limits are exceeded, a new card is employed.

In order to facilitate the changing of the cards, a pin 30, located on the line 21 near the center 4 is provided, and the cards 5 are further provided with orifices fitting said pin 30 and accurately located, so that the north points 18 of the various cards will always be displaced from the true north a correct angular distance corresponding to the particular angle φ pertaining to the speed and latitude for which the card was designed.

It will now be clear that with this invention the navigator employing a gyroscopic compass need not consult any complex tabulated data in order to readily ascertain the true course he is making, but he can read off said true course from the proper card at a glance.

It will further be seen that this invention does away with all mechanism requiring power to operate it in attaining its results, and that it is simple in construction and certain in operation.

It is obvious that those skilled in the art may vary the details of construction as well as the arrangement of parts without departing from the spirit of the invention and therefore it is not desired to limit the invention to the above disclosure, except as may be required by the claims.

What is claimed is:

1. In a gyroscopic compass provided with a rotating element the combination of an axis adapted to remain substantially fixed in direction while the said element is rotating; a graduated circle having a portion of its divisions expanded in accordance with a selected speed and latitude and fixed to said axis; and a second graduated circle concentric with said first named circle adapted when said element is rotating to move in azimuth with relation to said first named circle, substantially as described.

2. In a gyroscopic compass provided with a rotating element the combination of an axis controlled by said element; a graduated circle having one portion of its divisions expanded and another portion contracted in accordance with a selected speed and latitude and fixed to said axis; a second uniformly graduated circle located in close proximity to said first named circle; and means supporting said second circle adapted to turn the same in azimuth relation to said first named circle, substantially as described.

3. In a gyroscopic compass provided with a rotating element, the combination of an axis controlled by said element; a graduated circle having one portion of its divisions expanded and another portion contracted according to a predetermined speed and latitude, and said circle being fixed to said axis; a second uniformly graduated circle located in close proximity to said first named circle; and means supporting said second circle adapted to turn the same in azimuth relatively to said first named circle, substantially as described.

4. In a gyroscopic compass the combination of a rotating disk; a graduated circle having one portion of its divisions expanded and another portion contracted in a manner depending directly upon a selected speed and inversely upon a selected latitude, said circle controlled by said disk; a second uniformly graduated circle concentric to said first named circle; and gimbal mountings for said second circle adapted to move the same in azimuth relative to said first named circle, substantially as described.

5. In a gyroscopic compass the combination of a uniformly graduated circle; means to move said circle in azimuth; a circle having graduations expanded and contracted directly in accordance with a selected speed and course, and inversely in accordance with a selected latitude, and said circle located inside said uniformly graduated circle; and means by which said last named circle may be held substantially stationary while said first named circle is moved in azimuth, substantially as described.

In testimony whereof we affix our signatures, in presence of two witnesses.

GEORGE A. ROSSITER.
JOHN E. BEATTIE.

Witnesses:
LESLIE COFFMAN,
J. DENNISON.